United States Patent
Hoerentrup

(10) Patent No.: US 9,225,976 B2
(45) Date of Patent: Dec. 29, 2015

(54) REPRODUCTION DEVICE AND METHOD FOR OPERATING A GRAPHICS SUBSYSTEM IN THE REPRODUCTION DEVICE

(75) Inventor: Jobst Hoerentrup, Wennigsen (DE)

(73) Assignee: Thomson Licensing (FR)

( * ) Notice: Subject to any disclaimer, the term of this patent is extended or adjusted under 35 U.S.C. 154(b) by 0 days.

(21) Appl. No.: 13/984,060

(22) PCT Filed: Jan. 27, 2012

(86) PCT No.: PCT/EP2012/051310
§ 371 (c)(1),
(2), (4) Date: Aug. 7, 2013

(87) PCT Pub. No.: WO2012/107301
PCT Pub. Date: Aug. 16, 2012

(65) Prior Publication Data
US 2013/0315559 A1    Nov. 28, 2013

(30) Foreign Application Priority Data

Feb. 10, 2011 (EP) .................................... 11305137

(51) Int. Cl.
*H04N 5/775* (2006.01)
*H04N 13/04* (2006.01)
*H04N 13/00* (2006.01)

(52) U.S. Cl.
CPC ....... *H04N 13/0454* (2013.01); *H04N 13/0062* (2013.01); *H04N 13/0456* (2013.01)

(58) Field of Classification Search
None
See application file for complete search history.

(56) References Cited

U.S. PATENT DOCUMENTS

| 7,450,124 B2 | 11/2008 | Burch et al. | |
| 2010/0074594 A1 | 3/2010 | Nakamura et al. | |
| 2010/0269065 A1 | 10/2010 | Uchimura | |
| 2011/0050857 A1* | 3/2011 | Lee et al. | 348/47 |
| 2011/0080462 A1* | 4/2011 | Yamaji et al. | 348/42 |

(Continued)

FOREIGN PATENT DOCUMENTS

| CN | 101867837 | 10/2010 |
| CN | 102088638 | 6/2011 |

(Continued)

OTHER PUBLICATIONS

Search Rept: Apr. 17, 2012.

(Continued)

*Primary Examiner* — William C Vaughn, Jr.
*Assistant Examiner* — Eileen Adams
(74) *Attorney, Agent, or Firm* — Jack Schwartz & Associates, PLLC

(57) ABSTRACT

A method for operating a graphics subsystem of a reproduction device for display of video information comprising auxiliary information is described. Wherein the graphics subsystem is capable of generating left and right channel data for stereoscopic 3D display of auxiliary information in a 3D mode and of generating 2D data for 2D display of auxiliary information in a 2D mode, and can be switched between the display modes. The method has the steps of: providing 3D auxiliary information in the 3D mode, receiving a signal indicative to a change of the display mode, and leaving the graphics subsystem in the 3D mode while providing 2D auxiliary information to the graphics subsystem in response to said signal so as to provide the left and right channel with identical 2D auxiliary information to provide a 2D display of the same.

6 Claims, 4 Drawing Sheets

(56) References Cited

U.S. PATENT DOCUMENTS

2011/0122235 A1    5/2011  Lee et al.
2011/0188106 A1*   8/2011  Bae et al. .................. 359/226.3

FOREIGN PATENT DOCUMENTS

EP    2280553 A2    2/2011
WO    WO2011013036  2/2011

OTHER PUBLICATIONS

Eric Deleglise et al., "2D/3D Web Transitions: Methods and Techniques" Dept. of Computer Science and Egineering, Chalmers University of Technology, Sweden, WEBIST 2009 Proceedings of the Fifth International Conference on Web Information Systems and Technologies, INSTICC, Mar. 23, 2009.

* cited by examiner

REPRODUCTION DEVICE AND METHOD FOR OPERATING A GRAPHICS SUBSYSTEM IN THE REPRODUCTION DEVICE

This application claims the benefit, under 35 U.S.C. §365 of International Application PCT/EP2012/051310, filed Jan. 27, 2012, which was published in accordance with PCI Article 21(2) on Aug. 16, 2012 in English and which claims the benefit of European patent application No. 11305137.9, filed Feb. 10, 2011.

FIELD OF THE INVENTION

The invention relates to a reproduction device for display of video information and to a method for operating a graphics subsystem in the reproduction device.

BACKGROUND

Within the recent box office success of stereoscopic 3D movies, 3D entertainment like 3D video and 3D TV will be brought to home entertainment, too. One of the first available solutions is the Blu-ray 3D format. This format not only supports stereoscopic 3D display of a main video stream, it also supports stereoscopic 3D display of auxiliary information like, for example, 3D menus, 3D subtitles and/or 3D interactive applications written in the Java programming language. Exemplarily, a 3D interactive menu allows the user to select a certain scene, a different audio track, etc. In the following, information that is related to 3D menus, 3D subtitles, 3D interactive applications and the like shall be referred to as auxiliary information.

According to the Blu-ray 3D format, auxiliary information may be displayed in two different modes. In a 3D mode, also referred to as a 2-planes mode, the auxiliary information is displayed stereoscopically in 3D. For stereoscopic 3D display, left and right channel information is provided by a graphics subsystem and is reproduced stereoscopically by a suitable display. A software programming interface (API) of the graphics subsystem allows communication between a program layer, typically a Java application running on the reproduction device, and the graphics subsystem. On the other hand, the graphics subsystem is capable of running in a 2D mode, also referred to as a 1-plane mode. In this mode the user is provided a 2D display of auxiliary information. Display of auxiliary information is typically independent from the reproduction of a main video content. Exemplarily, a 2D interface or menu may be displayed in front of a background 3D main video stream. The user interface for the 2D mode is backwards compatible to existing 2D programming APIs. Further, the reproduction device is typically capable of running in a standard 2D mode, which shall be referred to as a 2D mode, too.

Depending on the user scenario, it will sometimes be necessary to switch the graphics subsystem between the 3D mode and the 2D mode. This may be due to a user's instruction or may be triggered by the program layer by e.g. a timing function in the Java code. The aforementioned switching between the 3D mode and the 2D mode relates to a switching process between a stereoscopic 3D display mode and a non-stereoscopic 2D display mode. This transition has to be distinguished from known technologies pertaining to a switching process between a pseudo 3D picture, e.g. a computer generated 3D scenario that is however displayed on a flat screen, i.e. in a stereoscopic way and a usual 2D display of information.

SUMMARY

It is an object of the invention to provide a reproduction device for display of video information comprising auxiliary information and further to provide a method for operating a graphics subsystem of the reproduction device that allow a smooth transition between a stereoscopic 3D display and a non-stereoscopic 2D display of auxiliary information.

According to an aspect of the invention, a method for operating a graphics subsystem of a reproduction device for display of video information is provided. The video information comprises auxiliary information and the graphics subsystem is capable of generating left and right channel data for stereoscopic 3D display of the auxiliary information in a 3D mode. The graphics subsystem is further capable of generating 2D data for 2D display of the auxiliary information in a 2D mode. Further, the graphics subsystem is switchable between the two display modes, i.e. the 3D mode and the 2D mode, e.g. via an application programmable interface. The method according to the invention comprises the steps of: providing 3D auxiliary information in the 3D mode, receiving a signal indicative to a change of the display mode, and leaving the graphics subsystem in the 3D mode while providing 2D auxiliary information to the graphics subsystem in response to said signal so as to provide the left and right channel with identical 2D auxiliary information in order to provide a 2D display of the same.

Typically, a Blu-ray disc comprises program code that is executable by a program layer of the reproduction device. Further, resources comprising raw data for e.g. a menu are typically stored in a Blu-ray disc. These resources comprise information for generating a stereoscopic 3D display of auxiliary data as well as information for a 2D display of the same. Exemplarily, there are resources for display of a 3D menu as well as resources for a 2D display of the respective menu.

The data is typically processed by a Java application and further input to the graphics subsystem for generation of the left and right channel data for a stereoscopic 3D display of the auxiliary information in the 3D mode. Alternatively, the Java application may provide 2D data to the graphics subsystem, which is further capable of generating 2D data for 2D display of the auxiliary information.

Typically, the graphics subsystem receives the signal indicative to a change of the display mode from the program layer, e.g. from the Java application. The signal may be a time-dependent trigger signal that is generated by the program layer. Further, the signal may be the result of a user input. Exemplarily, when a user switches the display of the auxiliary information from 3D to 2D display, the program layer will become aware of this input and accordingly generates the respective signal. In response to said signal, the data source and not the display mode of the graphics subsystem is changed. However, the visible result is similar, namely a switching between a stereoscopic 3D display of the auxiliary information and a 2D display of the same.

Advantageously, the method according to the invention allows a smooth transition between 3D and 2D display of auxiliary information, as will be outlined in the following by exemplarily referring to the Blu-ray format.

If a transition between the 3D mode and the 2D mode is desired, one of the two stereoscopic channels (usually the left channel) is taken for 2D display of the respective information. In other words, the transition between the 3D mode and the 2D mode occurs by switching the graphics subsystem from stereoscopic 3D display to a display of the left channel only; the right channel is switched off. This results in a 2D display of the auxiliary information. This switching process may however cause an unpleasant user experience. A transient state is generated and temporarily, a disrupted picture or graphic output is provided to the user.

It has been recognized that this unpleasant graphics output may be explained by the following considerations. For a stereoscopic 3D display of information, the left and right channel deviate from each other by a respective disparity value. In other words, for the left channel picture, a certain point in a stereoscopic object is slightly shifted to the right and for the right channel picture, the same point is slightly shifted to the left. If a hard cut between the stereoscopic 3D mode and the 2D mode is performed by simply switching to the left channel, the aforementioned point will shift or jump to the left immediately. If the display is refreshed later on, the change of display mode (from 3D to 2D) of the graphics subsystem has taken place. Consequently, the point in question located on the object will shift or jump back again. This is because the respective 2D data of the object is normally centered, i.e. not shifted by disparities. Normally, the 2D position of the object will be near to the previous position in the stereoscopic 3D object. The aforementioned steps will result in a flickering screen and/or a disrupted picture. The user will experience an unpleasant display of auxiliary information.

Based on the aforementioned considerations, the method according to the invention does not change the display mode of the graphics subsystem immediately but provides the left and right channel with identical data information, namely the 2D data for 2D display of the auxiliary information. As a result, the display is in 2D for the user while from a technical point of view, the graphics subsystem is still in the 3D mode. The user will not recognize this; in contrast, he or she experiences a smooth transition between 3D display of auxiliary information and 2D display of the same.

According to an aspect of the invention, subsequently to providing the left and right channel with the 2D data, the graphics subsystem is switched from the 3D mode to the 2D mode. Advantageously, no flickering or shifting of the screen will occur if the display mode switching is performed by setting the screen to the left channel of the stereoscopic 3D information, for example. This is because the left and right channel information is already completely identical. Switching to the left channel or—in other words—the shutdown of the right channel will not affect the information on the screen.

In another aspect of the invention, the 2D data results from the 3D data by setting the disparities between the left and right channel to zero. Advantageously, 3D image data may be transferred to 2D image data efficiently. The result is a 2D image that is located between the image of the left channel and the image of the right channel. Accordingly, no shift or a minimum shift only is present between the 3D object in the 3D mode and the 2D object in the 2D mode.

In another aspect of the invention, a reproduction device for display of video information comprising auxiliary information is provided. The reproduction device comprises a graphics subsystem that is capable of generating left and right channel data for stereoscopic 3D display of the auxiliary information in a 3D mode and that is further capable of generating 2D data for 2D display of the auxiliary information in a 2D mode. Further, the graphics subsystem is switchable between the two display modes, e.g. via an application programmable interface. The reproduction device according to the invention is configured to: set the graphics subsystem to a 3D mode for stereoscopic 3D display of auxiliary information, leave the graphics subsystem in the 3D mode upon occurrence of a signal indicative to a change of the display mode, and in reaction to said signal: provide the graphics subsystem with the 2D auxiliary information so as to provide the left and right channel with identical 2D auxiliary information so as to provide a 2D display of the auxiliary information.

Same or similar advantages already mentioned with respect to the method according to the invention apply to the reproduction device according to the invention.

BRIEF DESCRIPTION OF DRAWINGS

Further aspects of the invention will ensue from the following description of an example embodiment of the invention with reference to the accompanying drawings, wherein FIG. 1 schematically illustrates the communication between an application or program layer of a software running on a reproduction device and a graphics subsystem during transition from a 3D to a 2D display mode.

DETAILED DESCRIPTION OF AN EXEMPLARY EMBODIMENT

Figure 1:
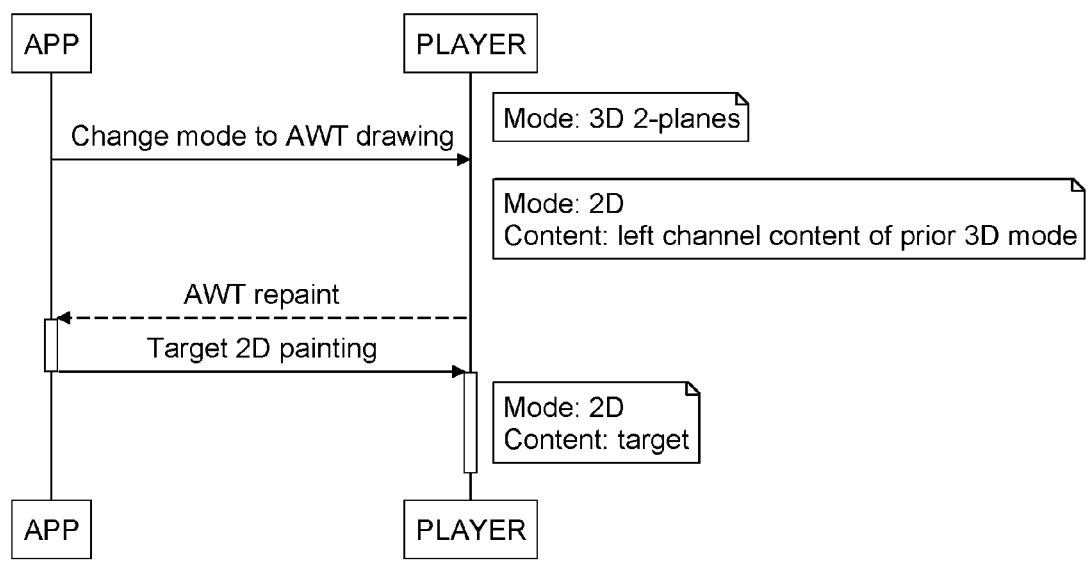

FIG. 1 schematically illustrates the communication between a software application APP, e.g. a Java-programmed software, running on a program layer of a display device, e.g. a Blu-ray player. This application APP communicates with a graphics subsystem PLAYER of of the display device via an application programmable interface. FIG. 1 exemplarily illustrates a typical change in the display mode from a stereoscopic 3D mode to a 2D mode. At the beginning, the graphics subsystem PLAYER is in a 3D mode, which is also referred to as a 2-planes mode. In this display mode the auxiliary information, e.g. a 3D menu, is displayed in a stereoscopic 3D mode. Typically, a Blu-ray player comprises a video subsystem and an independent graphics subsystem. The video subsystem generates left and right channel data for stereoscopic display of a main video. In the same way the graphics subsystem generates left and right channel data for stereoscopic display of 3D auxiliary information. For display of video information and auxiliary information the Blu-ray player takes into account both, i.e. information from the video subsystem as well as information from the graphics subsystem. Both subsystems are capable of operating independently from each other, i.e. a stereoscopic 3D menu may be shown in front of a stereoscopic 3D movie, or if the graphics subsystem operates in the 2D mode, a flat 2D menu is shown in front of a stereoscopic 3D movie.

In FIG. 1 the application APP requests the graphics subsystem PLAYER to switch graphics from the 3D 2-planes mode to a 2D mode, which is also referred to as an AWT drawing mode (AWT: abstract window toolkit). This switching command causes the graphics subsystem PLAYER to display the left channel of the previous stereoscopic 3D mode only. In other words, the displayed 2D graphics is equal to the left channel of the former stereoscopic 3D projection. This hard cut results in an unpleasant user experience since the stereoscopic 3D display collapses and the subsequent 2D graphics is shifted in comparison to the position of the 3D graphics displayed before. After a certain time interval, i.e. a refresh or repetition period, redrawing of the screen is requested by the graphics subsystem PLAYER, as it is indicated by the dashed arrow named "AWT repaint". The application APP reacts and provides 2D data of the respective object that is to be displayed (indicated by the arrow "Target 2D painting") to the graphics subsystem. Subsequently, the target, i.e. the object that is presently displayed, will be displayed in a 2D mode. This presentation is based on the 2D display data of the respective auxiliary information. Since the 2D data and the left channel of the stereoscopic 3D data are not equal, the displayed object will shift again. In summary, the aforementioned process results in a screen view that jitters or shows a disrupted object, which results in an unpleasant user experience.

Figure 2:
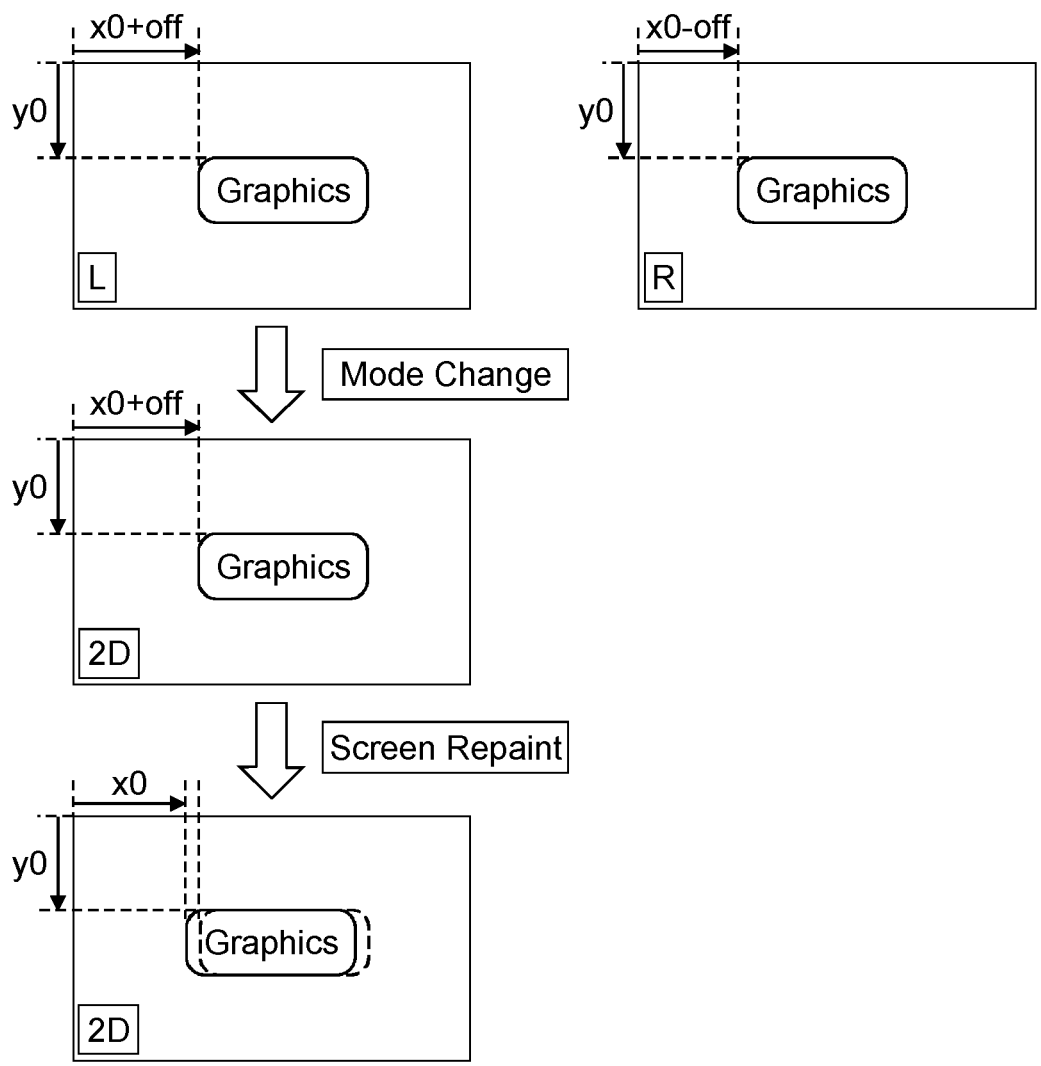
FIG. 2 illustrates schematic screenshots during a transition from a stereoscopic 3D mode to a 2D mode according to the art, FIG. 3 schematically illustrates the communication between an application or program layer of a software running on a reproduction device and a graphics subsystem during transition from a 3D to a 2D display mode, and FIG. 4 schematically illustrates screenshots for the transition from a stereoscopic 3D mode to a 2D display mode according to an embodiment of the invention.

In FIG. 2 simplified screenshots of this transition between the 3D mode and the 2D mode are shown. The first two screenshots (starting from top of FIG. 2) show the left channel L and the right channel R of a stereoscopic projection. The upper left corner of an object GRAPHICS, e.g. a 3D menu, starts at a position (x0+off, y0) for the left channel and (x0−off, y0) for the right channel. The value "off" is a value corresponding to a horizontal disparity between the left and right channel, which allows a stereoscopic 3D display of the object. Typically, the disparity will be twice the "off"-value. In the second row the display mode is changed from the 3D mode to the 2D mode and the screen is set to display the image content of the stereoscopic left channel L. The user will experience a shift of the object. This is due to the fact that the upper left corner of the 3D object will appear more or less at the position (x0, y0). After the change of the display mode, the object GRAPHICS shifts to the position (x0+off, y0).

After a refresh of the display, the object GRAPHICS in the left channel L is replaced by the target 2D object GRAPHIS. Accordingly, the object GRAPHICS will shift again, i.e. from position (x0+off, y) to position (x0, y0). Consequently, the user first experiences a shift to the right and after the refresh a shift back to the left to position (x0, y0). Depending on the refresh rate the user will see a flickering or quickly shifting object.

In the following, a preferred embodiment of the invention will be explained by making reference to FIG. 3 and FIG. 4.

Figure 3:
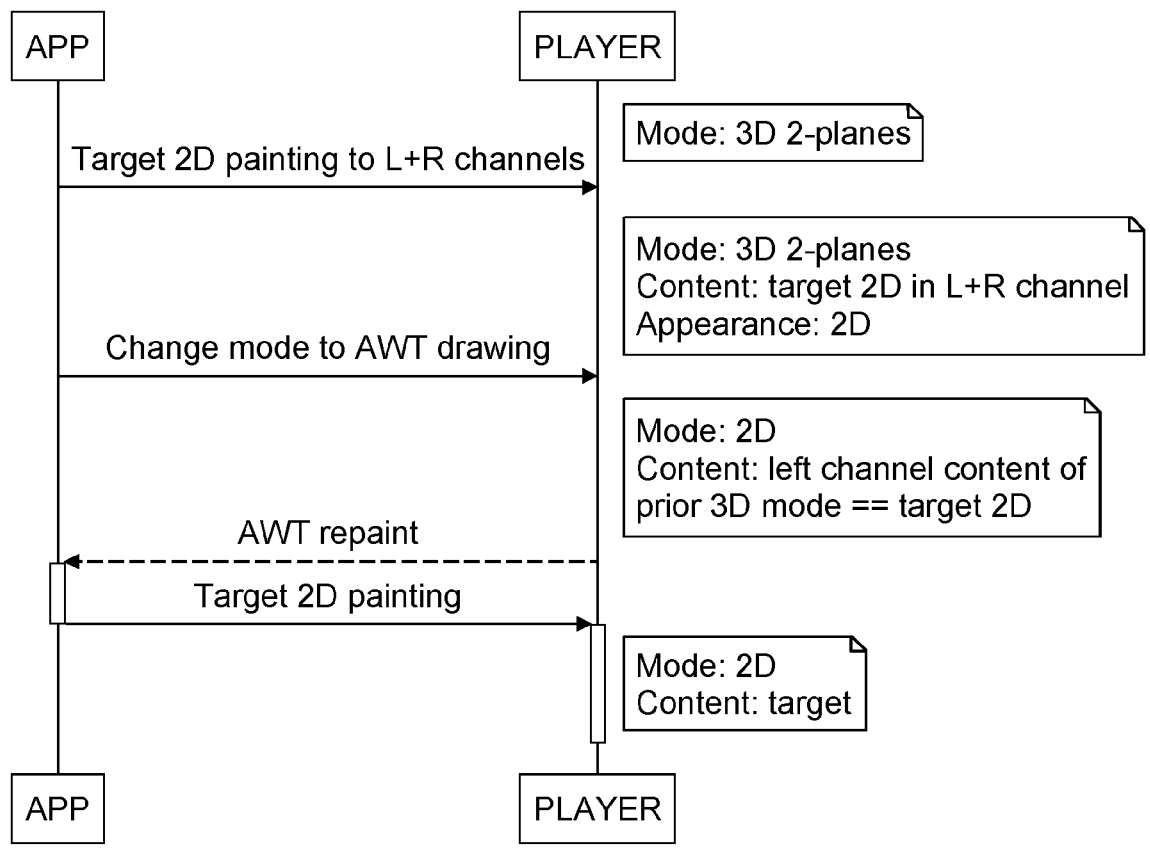

FIG. 3 schematically illustrates the communication between an application APP, e.g. a Java software running on a program layer of a display device, and a graphics subsystem PLAYER of the display device. At the beginning the graphics subsystem PLAYER is in the 3D mode. The application APP receives a request to change the display mode from the 3D mode to the 2D mode. This request may be triggered e.g. by a timing function or may be due to a user input. Accordingly, the application APP provides the left and right stereoscopic channel with the target 2D data for the auxiliary information. This is indicated by the arrow named "Target 2D painting to L+R channels". As a result, the 3D stereoscopic image collapses to a 2D image. However, the horizontal position of the respective objects as perceived by the viewer will not shift or show a very small shift only. The position of the displayed object GRAPHICS, e.g. a user menu, more or less remains at its position. The graphics subsystem PLAYER is still in the 2-planes mode, i.e. in a stereoscopic mode. The displayed content however, which is defined by the data of the left and right channel, appears in 2D. Subsequently, the application APP switches the graphics subsystem PLAYER from the 3D mode to the 2D mode. In this mode the content of the left channel of the prior 3D mode is displayed. Since the left and right channel already comprise completely identical information, no change in the display occurs. The user will not notice that the technical mode of the graphics subsystem PLAYER has changed from the 3D mode to the 2D mode.

After a time interval, the graphics subsystem PLAYER requests the application APP to refresh the screen. The auxiliary information is now updated in the 2D mode. However, as the updated information is identical to the information before no change in the display screen will occur.

Figure 4:
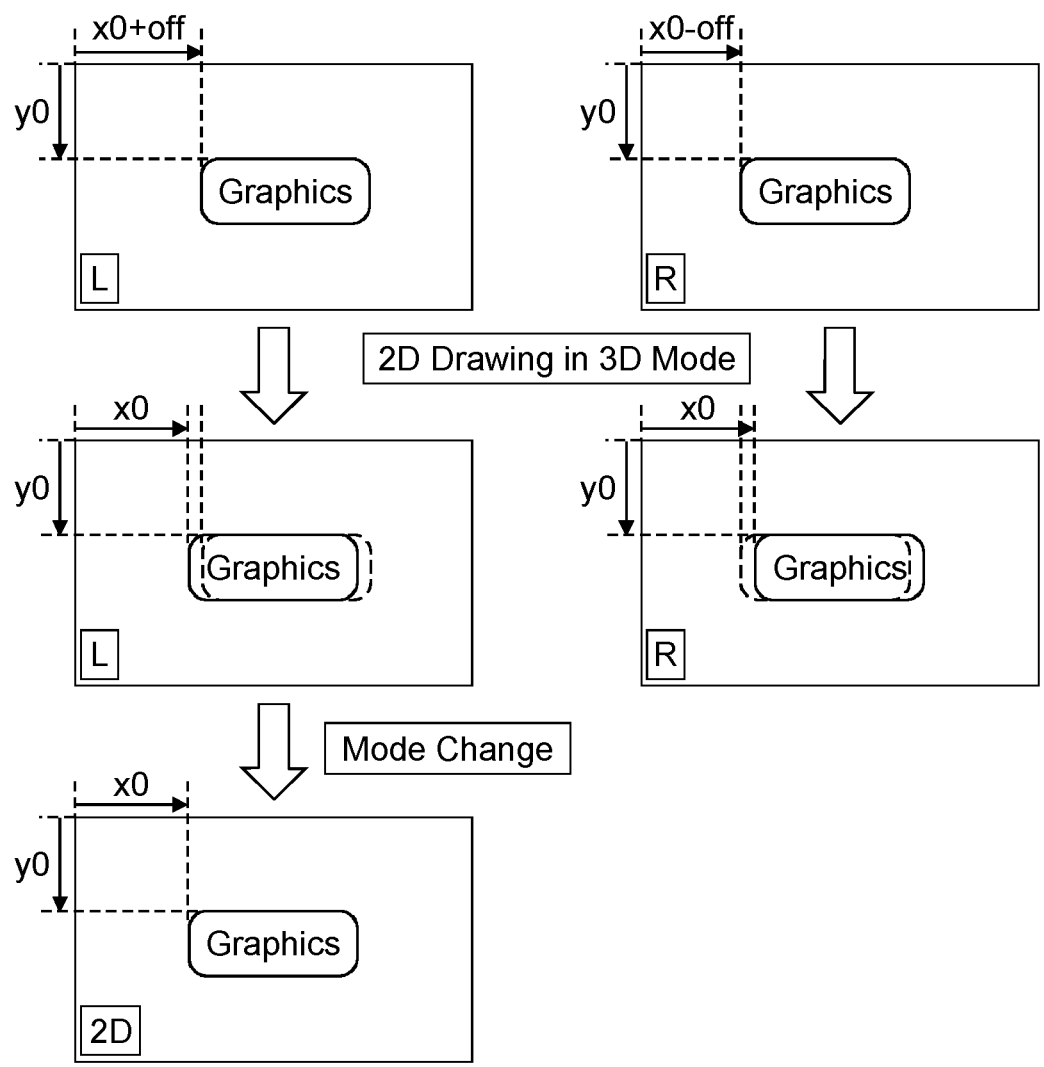

FIG. 4 schematically illustrates the process according to the aforementioned embodiment. In the first two screenshots (starting from the top of FIG. 4) the image content of a left channel L and a right channel R is shown. An object GRAPHICS is located at a position (x0+off, y0) for the left channel L and at a position (x0−off, y0) for the right channel R. Again, the position of the object is identified by exemplarily referring to its upper left corner. In the second row, the transition between the 3D display mode and the 2D display mode is indicated by "2D drawing in 3D mode". The stereoscopic projection of the object GRAPHICS collapses to a flat 2D display of the same by replacing the object GRAPHICS in both the left channel L and the right channel R with the target 2D object GRAPHIC. This is achieved, for example, by setting the offset OFF to zero. For both channels the position of the object GRAPHICS is thus shifted to (x0, y0). While the stereoscopic 3D display of object GRAPHICS collapses to a 2D display of the same, the horizontal position of the object as perceived by the viewer more or less remains the same. In the 3D mode the object approximately appears at (x0, y0) and when the target 2D object GRAPHIC is provided to both channels, the horizontal position remains at (x0, y0).

In the third row of FIG. 4, the display mode of the graphics subsystem PLAYER is changed from the 3D mode to the 2D mode, i.e. the graphics subsystem is set from the 2-planes mode to the 1-plane mode. However, no shift of the object GRAPHICS occurs. The display is set to the content of the left channel. Since both, the left and right channel, comprise identical information, the switching of the display mode will not affect the display of the content, i.e. the object GRAPHIC on the user's screen.

Although the invention has been described hereinabove with reference to a specific embodiment, it is not limited to this embodiment and no doubt further alternatives will occur to the skilled person that lie within the scope of the invention as claimed.

The invention claimed is:

1. A method for operating a graphics subsystem of a reproduction device comprising a graphics subsystem and a video subsystem for display of video information comprising auxiliary information, wherein the graphics subsystem is capable of generating left and right channel data for stereoscopic 3D display of auxiliary information in a 3D mode, and wherein the graphics subsystem is further capable of generating 2D data for 2D display of auxiliary information in a 2D mode, the graphics subsystem being switchable between the display modes, the method comprising providing 3D auxiliary information to the graphics subsystem in the 3D mode so as to provide the left channel with the left channel of the 3D auxiliary information and the right channel with the right channel data of the 3D auxiliary information, receiving a request of change the display mode from the 3D mode to the 2D mode, leaving the graphics subsystem in the 3D mode and outputting both the left channel and the right channel for display while providing 2D auxiliary information to the graphics subsystem in response to said request so as to provide the left channel and the right channel with identical 2D auxiliary information to provide a 2D display of the 2D auxiliary information, and after a time interval, switching the graphics subsystem from the 3D mode to the 2D mode.

2. The method according to claim 1, wherein the 2D data results from the 3D data by setting disparities between the left and right channel to zero.

3. A reproduction device for display of video information comprising auxiliary information, the reproduction device comprising a video subsystem and a graphics subsystem that is capable of generating left and right channel data for stereoscopic 3D display of the auxiliary information in a 3D mode and that is further capable of generating 2D data for 2D display of the auxiliary information in a 2D mode, wherein the graphics subsystem is switchable between the two display modes, wherein the reproduction device is configured to set the graphics subsystem to a 3D mode for stereoscopic 3D display of auxiliary information so as to provide the left channel with the left channel data of the 3D auxiliary information and the right channel with the right channel data of the 3D auxiliary information, receive a request to change the display mode from the 3D mode to the 2D mode, and in response to said request:

leave the graphics subsystem in the 3D mode and output both the left channel and the right channel for display while providing the graphics subsystem with the 2D auxiliary information so as to provide the left channel and the right channel with identical 2D auxiliary information so as to provide a 2D display to the auxiliary information, and after a time interval, switch the graphics subsystem from the 3D mode to the 2D mode.

4. The reproduction device according to claim 3, wherein the reproduction device is further configured to generate the 2D data from the 3D data by setting disparities between the left and right channel to zero.

5. A non-transitory storage medium comprising video information, auxiliary information, and a program code that is executable by a program layer of a reproduction device, the reproduction device comprising a video subsystem and a graphics subsystem that is capable of generating left and right channel data for stereoscopic 3D display of the auxiliary information in a 3D mode and that is further capable of generating 2D data for 2D display of the auxiliary information in a 2D mode, wherein the graphics subsystem is switchable between the two display modes, wherein, when executed by the program layer of the reproduction device, the program code configures the reproduction device to:

set the graphics subsystem to a 3D mode for stereoscopic 3D display of auxiliary information so as to provide the left channel with the left channel data of the 3D auxiliary information and the right channel with the right channel data of the 3D auxiliary information, receive a request to change the display mode from the 3D mode to the 2D mode, and in response to said request;

leave the graphics subsystem in the 3D mode and output both the left channel and the right channel for display while providing the graphics subsystem with the 2D auxiliary information so as to provide the left channel and the right channel with identical 2D auxiliary information so as to provide a 2D display to the auxiliary information, and after a time interval, switch the graphics subsystem from the 3D mode to the 2D mode.

6. The non-transitory storage medium according to claim 5, wherein the program code further configures the reproduction device to generate the 2D data from the 3D data by setting disparities between the left and right channel to zero.

* * * * *